Patented Mar. 4, 1941

2,233,513

UNITED STATES PATENT OFFICE 2,233,513

ESTERS OF AROYL BENZOIC ACIDS

Herman A. Bruson, Philadelphia, Pa., assignor, by mesne assignments, to American Cyanamid Company, New York, N. Y.

No Drawing. Application October 3, 1929, Serial No. 397,143

8 Claims. (Cl. 260—469)

This invention relates to organic solvents and more particularly to aliphatic or aromatic esters of monobasic keto-benzoic acids having the general formula

R—CO—R'—COOH wherein R and R' represent aromatic nuclei. Typical acids which belong to this class are:

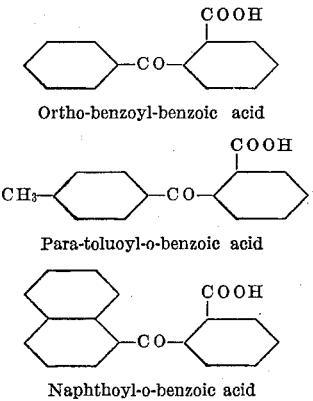

Ortho-benzoyl-benzoic acid

Para-toluoyl-o-benzoic acid

Naphthoyl-o-benzoic acid and their derivatives such as 2,4-dichlorobenzoyl-o-benzoic acid, methyl-isopropyl-benzoyl-o-benzoic acid (cymoyl-o-benzoic acid), and the like.

The lower esters of some of these acids, such as the methyl- and ethyl- esters, have in part already been described in the literature as crystalline solids. They have not however found any extensive commercial application in the arts. Moreover, it could not have been foretold that the higher esters of these acids would form valuable, high boiling oily liquids which solubilize nitrocellulose and which can be used in conjunction with other solvents in the preparation of pyroxylin lacquers, as plasticizers for the final nitro-cellulose film.

We have discovered that the higher esters of the aforementioned keto-benzoic acids possess physical properties which are desirable in plasticizers for nitrocellulose or acetyl cellulose films. They are all high boiling, heavy liquids having a marked solubilizing action upon nitrocellulose and possessing sufficient tackiness to give the film in which they are present a certain degree of adhesion.

The esters which we have prepared are all derived from saturated monohydric alcohols which contain three or more carbon atoms in the molecule, such as iso-propyl, butyl, isoamyl, beta-ethoxyethyl, beta-butoxyethyl, benzyl and cyclohexyl alcohols. These esters may all be prepared by heating the corresponding monohydric alcohol with any one of the keto-benzoic acids having the general formula,

R—CO—R'—COOH wherein R and R' are aromatic nuclei, in the presence of a dehydration catalyst such as sulphuric acid, hydrochloric acid, zinc chloride, or the like; subsequently removing the catalyst, distilling off the excess of alcohol, and fractionating the residual oil in vacuo.

Illustrations are given below of the general method of preparation of the above esters, as well as a table of the physical properties of other typical esters of the same class, which we have prepared as new compounds.

Example 1

*Butyl-o-benzoyl-benzoate*

A mixture of 75 grams ortho-benzoyl-benzoic acid, 150 cubic centimeters butyl alcohol, and a dehydration catalyst, preferably 10 cc. of concentrated sulphuric acid (Sp. Gr. 1.84) are refluxed at the boiling point for eight hours. The mixture is allowed to cool and is then washed, first with water to remove the sulphuric acid, then with dilute sodium carbonate solution, and finally with water to remove traces of alkali. The oil is then fractionated. At first unchanged butyl alcohol distills over. The butyl ester then comes over as a colorless, limpid, oily liquid, boiling at 241–244° C. under 20 m. m. pressure.

Example 2

*Cyclohexyl ester of para-toluoyl-o-benzoic acid*

Boil under reflux, a mixture of 75 gr. para-toluoyl-o-benzoic acid, 150 cc. cyclohexanol, and 10 cc. concentrated sulphuric acid for 6 hrs. After cooling, the product is washed with water and sodium carbonate solution until all traces of free acid are removed. The excess cyclohexanol is then distilled off at reduced pressure. The residual high boiling oil is fractionated in vacuo, whereupon the cyclohexyl ester distills over at 252–254° C. under 7 m. m. pressure. It forms a thick, colorless viscous oil.

Example 3

*Beta-ethoxy-ethyl ester of ortho-benzoyl benzoic acid*

To 120 cubic centimenters of ethylene glycol-mono-ethyl ether, $C_2H_5$—O—$CH_2$—$CH_2OH$, 50 gr. of ortho-benzoyl benzoic acid and 10 cc. concentrated sulphuric acid are added, and the mixture is boiled for 3 hours under reflux. The cooled liquid is washed with water and dilute sodium carbonate solution to remove excess alcohol and acid, and the residual ester fractionated in vacuo. It comes over as a colorless oil at 221-225° C. under 5 m. m. pressure.

EXAMPLE 4

*Butyl-ortho-naphthoyl benzoate*

50 grams of ortho-naphthoyl-benzoic acid are boiled under reflux with 100 cc. of butyl alcohol and 10 cc. concentrated sulphuric acid for 5 hours. The cooled liquid is washed free from unchanged acid and catalyst with water and sodium carbonate solution, and the residual oil is fractionally distilled in vacuo. At first unchanged butyl alcohol came over. The ester then distilled over as a slightly yellowish, very viscous oil, boiling at 258-263° C. under 5 m. m. pressure.

In a similar way, using the same relative quantities of keto-acid, alcohol, and sulphuric acid, and boiling for 6 to 8 hours under reflux, the following esters were prepared.

| Acid used | Ester | Boiling point of ester | Properties |
|---|---|---|---|
| Ortho-benzoyl-benzoic | Iso-propyl | 240-243° C./20 mm | Heavy colorless liquid. |
| Do | Iso-amyl | 215-218° C./4 mm | Colorless, oily liquid. |
| Do | Benzyl | 278-282° C./16 mm | Do. |
| Do | Cyclohexyl | 251-254° C./10 mm | Do. |
| Do | Beta-butoxy-ethyl | 224-229° C./4 mm | Do. |
| Do | Capryl | 264-268° C./20 mm | Do. |
| Para-toluoyl-o-benzoic | Isopropyl | 217-218° C./8 mm | Do. |
| Do | N-butyl | 244-248° C./17 mm | Do. |
| Do | Iso-amyl | 224-228° C./4 mm | Do. |
| Do | Beta-ethoxy-ethyl | 237-238° C./5 mm | Do. |
| Do | Benzyl | 305-310° C./4 mm | Do. |
| 2-4-dichloro-benzoyl-benzoic | n-Butyl | 232-237° C./7 mm | Do. |
| Ortho-naphthoyl-benzoic | Benzyl | 315-318° C./5 mm | Heavy oil. |
| Do | Cyclohexyl | Above 320° C./4 mm | Very viscous oil. |

All of the above esters may be used as plasticizers for nitrocellulose or for acetyl cellulose. Other esters of acids belonging to the general class

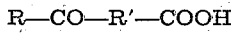

wherein R and R' are aromatic nuclei, may likewise be prepared for the same purpose. These include the propyl, iso-butyl, amyl, bornyl and methylcyclohexyl esters. All of these esters may be represented by the following general formula:

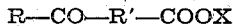

wherein R and R' are aromatic nuclei, and X is an organic radicle containing at least three carbon atoms.

Although only the preferred embodiments of this invention have been described in detail it will be apparent to those skilled in the art that various other acids than those specifically mentioned, but belonging however, to the same general class, may be used. Thus we have successfully employed para-ethyl-benzoyl-o-benzoic acid, dimethyl-benzoyl-o-benzoic acid, para-phenyl-benzoyl-o-benzoic acid, alpha- and beta-methyl naphthoyl-o-benzoic acids, α-chlornaphthoyl-o-benzoic acid and tetrahydro-naphthoyl-o-benzoic acid for preparing similar esters. It is to be understood that the above examples are merely illustrative and that the invention is not confined to any specific temperatures, methods of operation, materials used, etc., since the scope of the invention is limited only as indicated in the claims which follow.

What I claim is:

1. As a new compound an ester of the general formula R—CO—R'—CO·OX where R and R' are aromatic nuclei and X is a butyl group.

2. As a new compound, the cyclohexyl ester of paratoluoyl-ortho-benzoic acid.

3. The step in the process of preparing the butyl ester of para-toluoyl-ortho-benzoic acid which consists in condensing said acid with excess butyl alcohol in the presence of sulphuric acid.

4. As a new compound an ester of the general formula R—CO—R'—CO·OX where R and R' are aromatic nuclei, and X is a cyclohexyl group.

5. As a new compound an ester of the general formula R—CO—R'—CO·OX where R and R' are aromatic nuclei and X is a saturated aliphatic organic radical having from 3 to 10 carbon atoms.

6. An ester of benzoylbenzoic acid and a saturated monohydric paraffin alcohol containing more than two and less than eight carbon atoms.

7. An ester of a diarylketoneorthocarboxylic acid of the formula R—COR'COOH, and a saturated monohydric alcohol of the paraffin series having more than two carbon atoms, R and R' being aromatic nuclei free from halogen and hydroxyl substituents.

8. An ester of benzoylbenzoic acid with a saturated monohydric paraffin alcohol of a molecular weight greater than 46.

HERMAN A. BRUSON.